US 8,861,512 B2

(12) United States Patent
Camilleri et al.

(10) Patent No.: US 8,861,512 B2
(45) Date of Patent: *Oct. 14, 2014

(54) METHOD OF ENABLING A WIRELESS DEVICE TO MAKE A NETWORK CONNECTION WITHOUT USING A NETWORK OPERATOR'S HOME LOCATION REGISTER

(75) Inventors: Michael Camilleri, Berkshire (GB); Jose Luis Merino Gonzalez, Malaga (ES)

(73) Assignee: Shoo 533 Limited, Berkshire (GB)

( * ) Notice: Subject to any disclaimer, the term of this patent is extended or adjusted under 35 U.S.C. 154(b) by 710 days.

This patent is subject to a terminal disclaimer.

(21) Appl. No.: 12/281,840

(22) PCT Filed: Mar. 7, 2007

(86) PCT No.: PCT/GB2007/000782
§ 371 (c)(1),
(2), (4) Date: Dec. 8, 2008

(87) PCT Pub. No.: WO2007/101996
PCT Pub. Date: Sep. 13, 2007

(65) Prior Publication Data
US 2009/0303942 A1    Dec. 10, 2009

(30) Foreign Application Priority Data
Mar. 7, 2006    (GB) .................................. 0604537.1

(51) Int. Cl.
*H04L 12/66*    (2006.01)
*H04W 8/08*    (2009.01)
*H04L 29/06*    (2006.01)
*H04W 76/02*    (2009.01)
*H04W 80/04*    (2009.01)

(52) U.S. Cl.
CPC ......... *H04L 29/06027* (2013.01); *H04W 8/082* (2013.01); *H04W 76/02* (2013.01); *H04L 65/1069* (2013.01); *H04W 80/04* (2013.01)

USPC ........... 370/356; 370/352; 370/401; 455/416; 455/433; 455/445

(58) Field of Classification Search
USPC ........... 455/445, 453, 435.1, 417, 422.1, 428, 455/433, 416; 370/329, 352–356
See application file for complete search history.

(56) References Cited

U.S. PATENT DOCUMENTS 5,847,680 A * 12/1998 McBurney ............... 342/357.27
5,901,341 A *  5/1999 Moon et al. ..................... 455/9
(Continued)

FOREIGN PATENT DOCUMENTS

JP    2005-045324    2/2005
WO    WO 05/020027    3/2005

OTHER PUBLICATIONS

International Preliminary Report on Patentability, dated Sep. 9, 2008, and Written Opinion, issued in corresponding International Application No. PCT/GB2007/000782.

(Continued)

*Primary Examiner* — Sharad Rampuria
(74) *Attorney, Agent, or Firm* — Saul Ewing LLP

(57) ABSTRACT

A wireless device can initiate a network connection without using a network operator's home location register. The wireless device sends data to a server that defines a call request; and the server decides on the appropriate routing over all available networks for that call request. But, unlike a conventional HLR, the server can receive communications from the device using any one of several different protocols, and is not limited to the MAP (mobile application part) protocol. For example, the wireless device can use SMS or HTTP over the internet to communicate with the server. The server then determines the appropriate least cost routing.

24 Claims, 6 Drawing Sheets

(56) References Cited

U.S. PATENT DOCUMENTS

| | | | |
|---|---|---|---|
| 6,014,558 A * | 1/2000 | Thomas | 455/410 |
| 6,493,548 B1 * | 12/2002 | Kinoshita | 455/412.1 |
| 6,614,781 B1 * | 9/2003 | Elliott et al. | 370/352 |
| 6,687,357 B1 * | 2/2004 | Sakaue et al. | 379/202.01 |
| 6,868,272 B1 * | 3/2005 | Berkowitz et al. | 455/445 |
| 7,523,190 B1 * | 4/2009 | Bickerstaff et al. | 709/224 |
| 7,564,839 B1 * | 7/2009 | Kung et al. | 370/352 |
| 7,564,840 B2 * | 7/2009 | Elliott et al. | 370/356 |
| 7,576,692 B2 * | 8/2009 | Sairo et al. | 342/386 |
| 7,593,686 B1 * | 9/2009 | Knoop | 455/3.04 |
| 7,852,831 B2 * | 12/2010 | Akbar | 370/352 |
| 7,894,807 B1 * | 2/2011 | Drennan | 455/417 |
| 8,265,083 B1 * | 9/2012 | Cannon et al. | 370/395.52 |
| 8,626,158 B2 * | 1/2014 | Zhu | 455/433 |
| 2002/0094073 A1 * | 7/2002 | Falkoff et al. | 379/201.01 |
| 2002/0112014 A1 * | 8/2002 | Bennett et al. | 709/206 |
| 2002/0146107 A1 * | 10/2002 | Baals et al. | 379/215.01 |
| 2003/0046584 A1 * | 3/2003 | Laksono | 713/201 |
| 2003/0055985 A1 * | 3/2003 | Corb et al. | 709/227 |
| 2004/0064734 A1 * | 4/2004 | Ehrlich | 713/201 |
| 2004/0121785 A1 * | 6/2004 | Vance et al. | 455/466 |
| 2004/0162058 A1 * | 8/2004 | Mottes | 455/411 |
| 2004/0198327 A1 * | 10/2004 | Bates et al. | 455/414.1 |
| 2005/0058094 A1 * | 3/2005 | Lazaridis et al. | 370/328 |
| 2005/0157677 A1 * | 7/2005 | Dowling | 370/328 |
| 2005/0228860 A1 * | 10/2005 | Hamynen et al. | 709/203 |
| 2005/0286466 A1 * | 12/2005 | Tagg et al. | 370/329 |
| 2006/0047539 A1 * | 3/2006 | Huang | 705/4 |
| 2006/0136581 A1 * | 6/2006 | Smith | 709/224 |
| 2006/0183460 A1 * | 8/2006 | Srinivasan et al. | 455/410 |
| 2006/0251057 A1 * | 11/2006 | Kwon et al. | 370/352 |
| 2007/0036127 A1 * | 2/2007 | Roosen et al. | 370/352 |
| 2007/0165826 A1 * | 7/2007 | Le Creff et al. | 379/220.01 |
| 2007/0179705 A1 * | 8/2007 | Asai | 701/200 |
| 2007/0280464 A1 * | 12/2007 | Hughes et al. | 379/205.01 |
| 2010/0144344 A1 * | 6/2010 | Jiang | 455/433 |

OTHER PUBLICATIONS

International Search Report issued in priority application No. PCT/GB2007/000782.

* cited by examiner

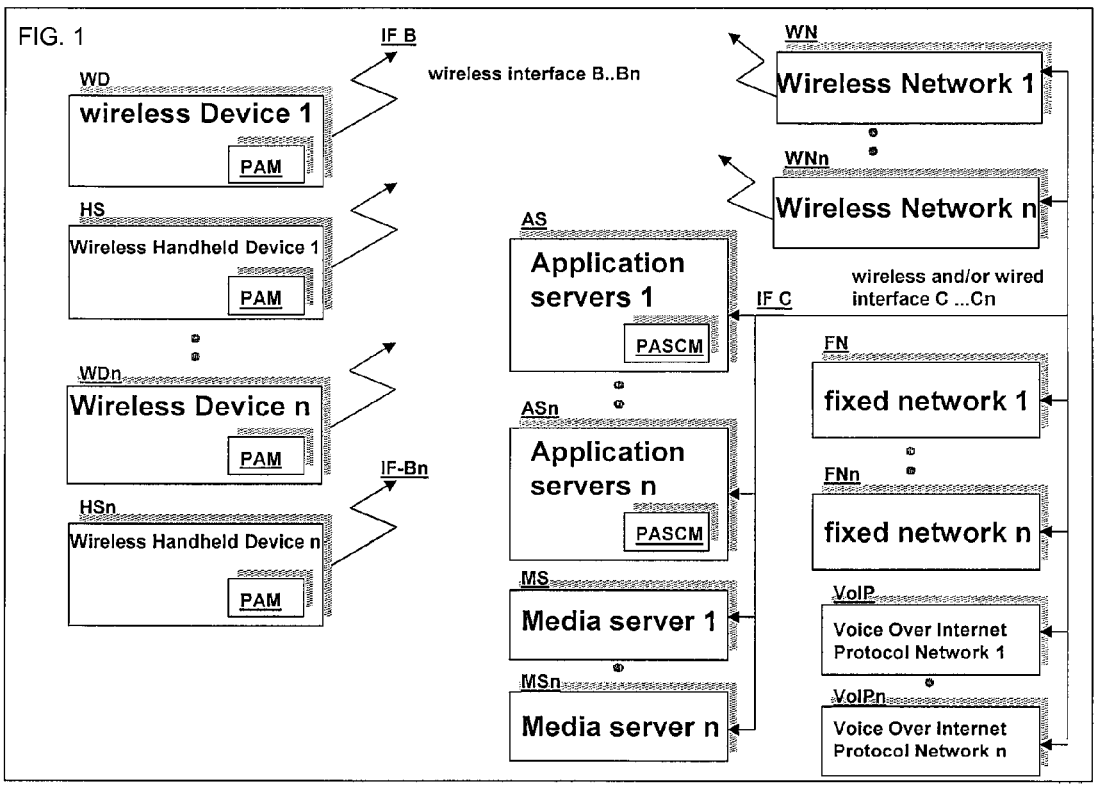
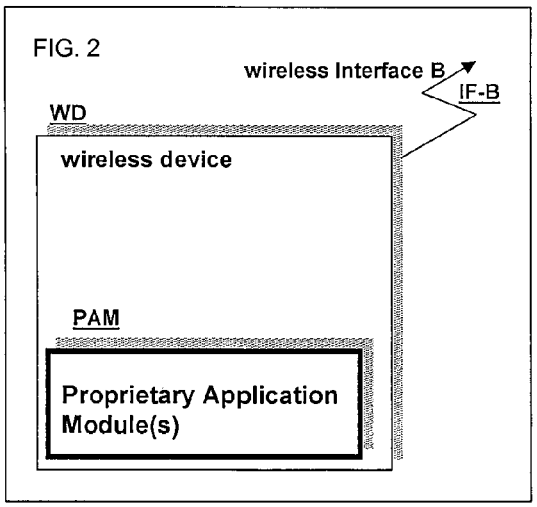
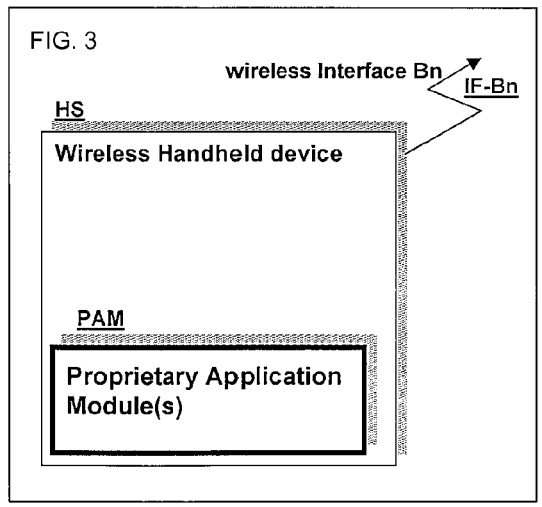

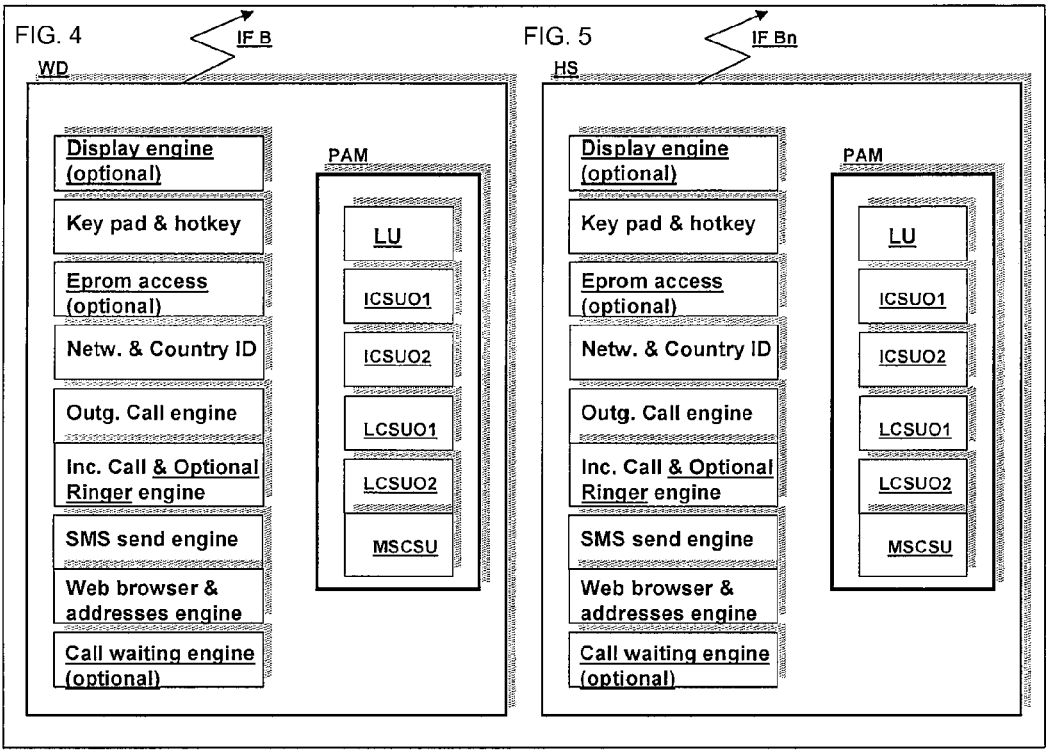
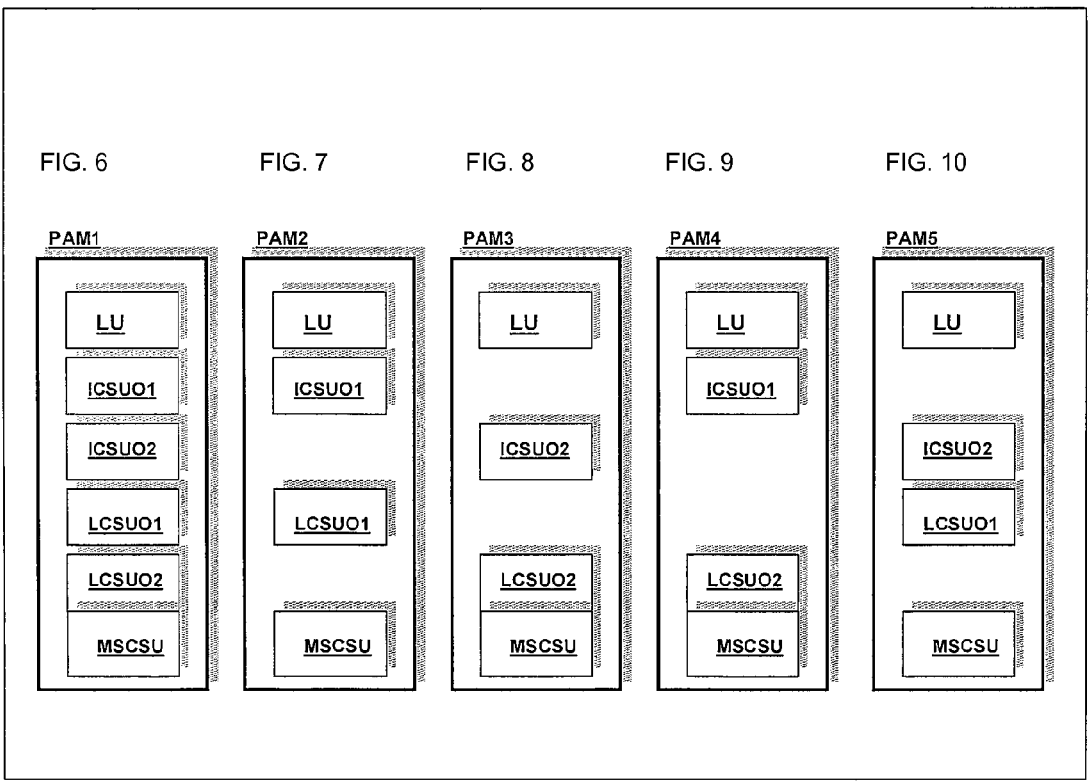

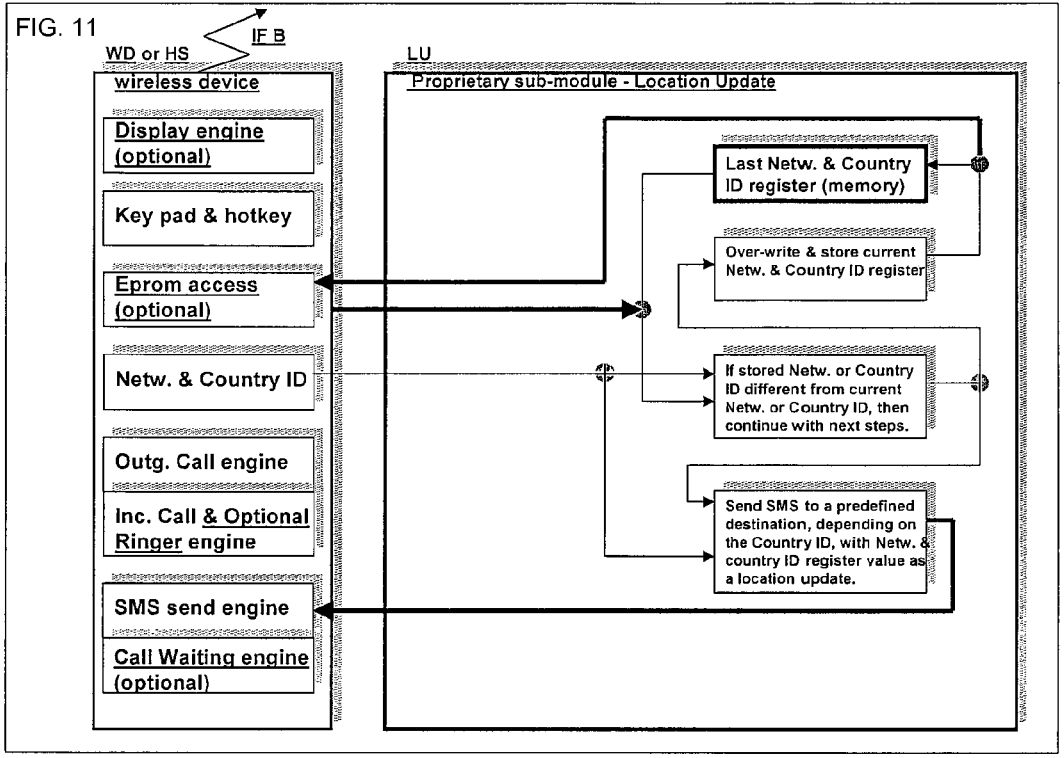
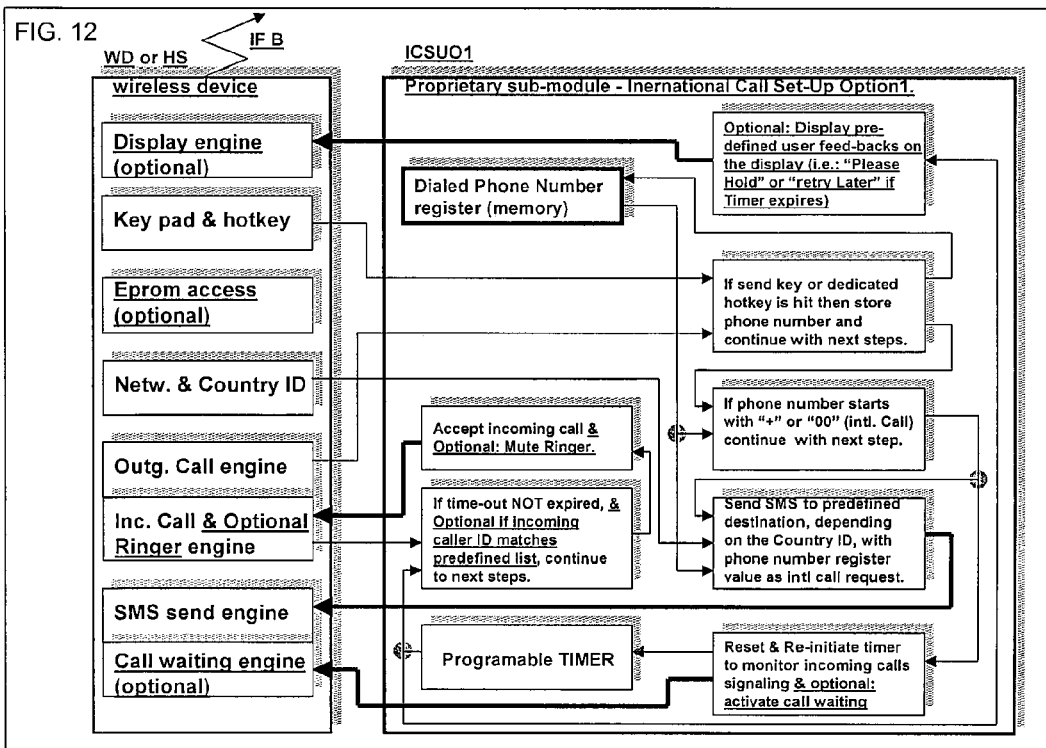

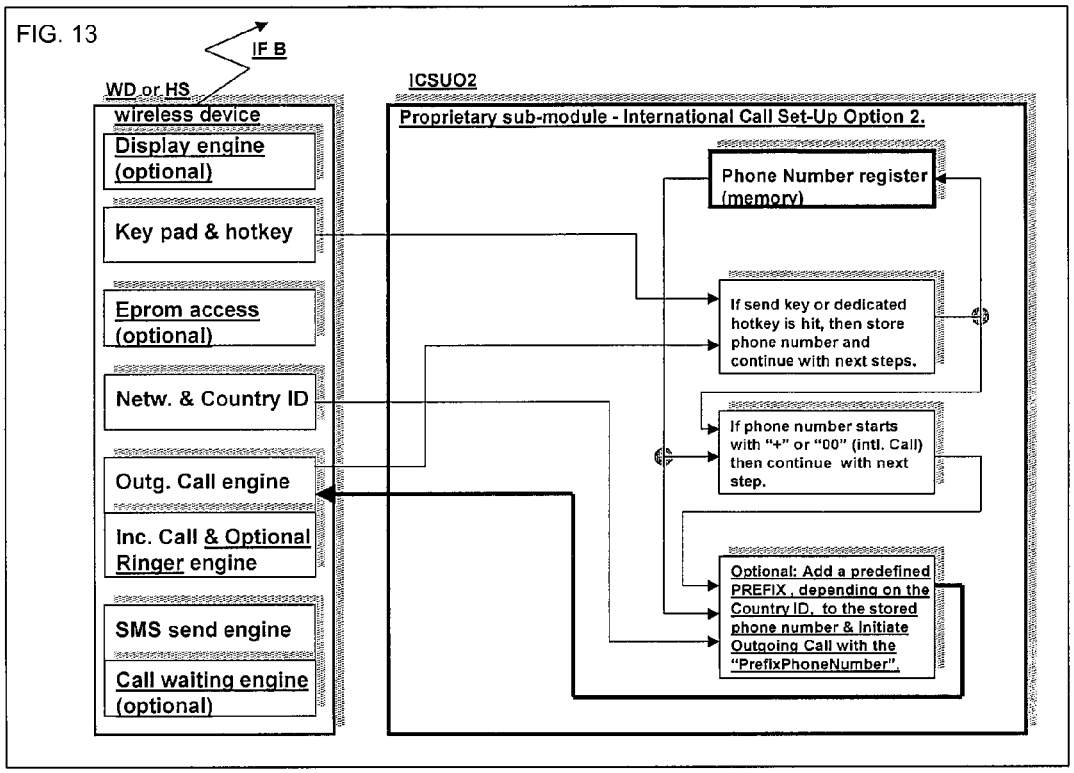
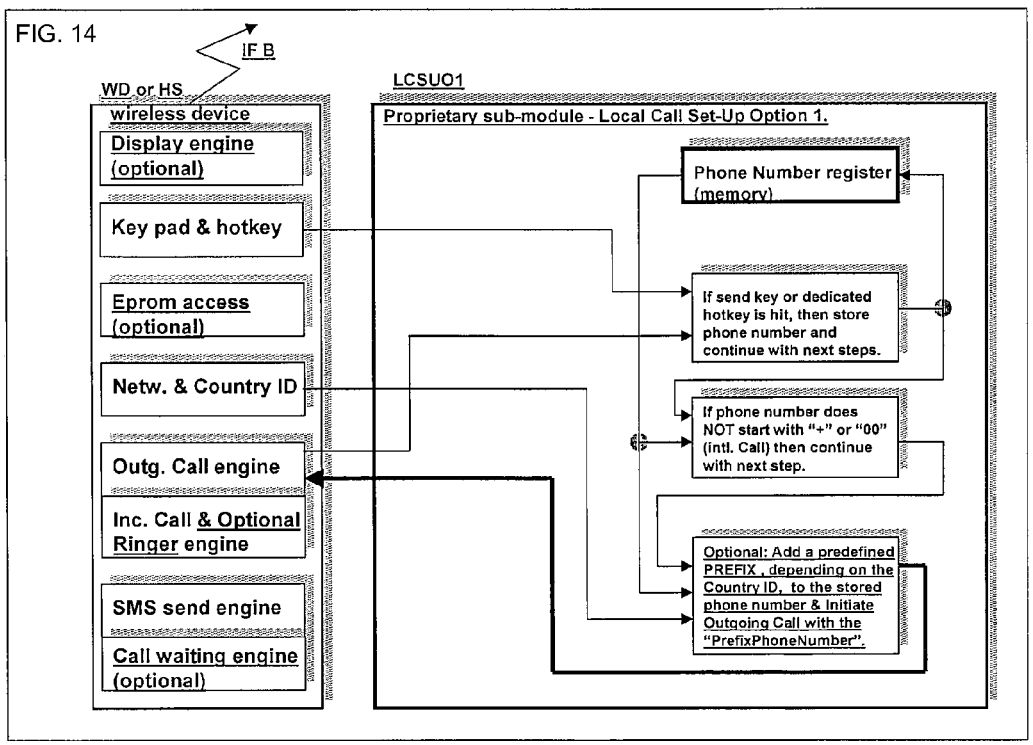

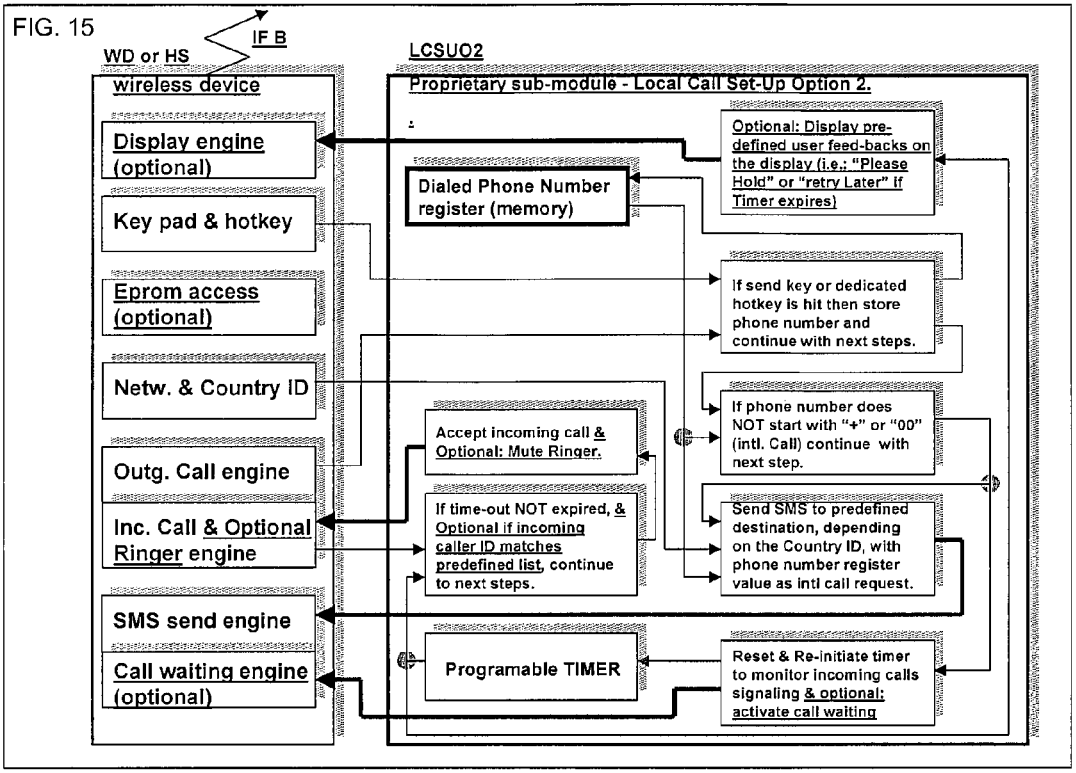
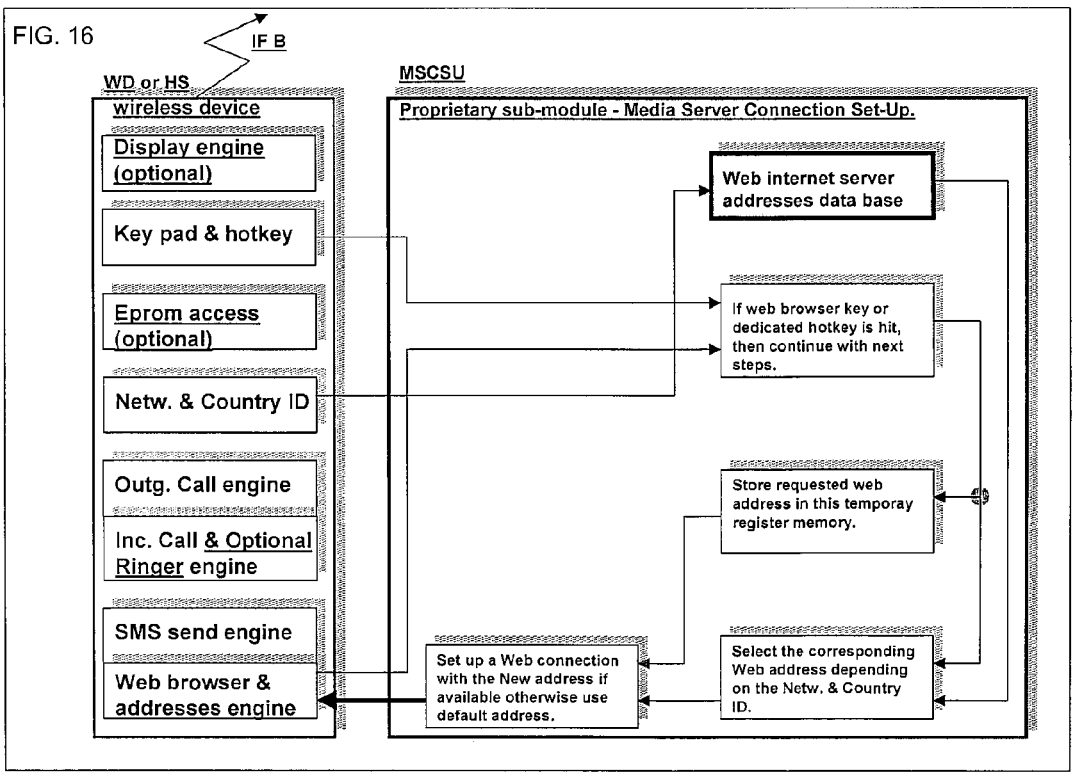

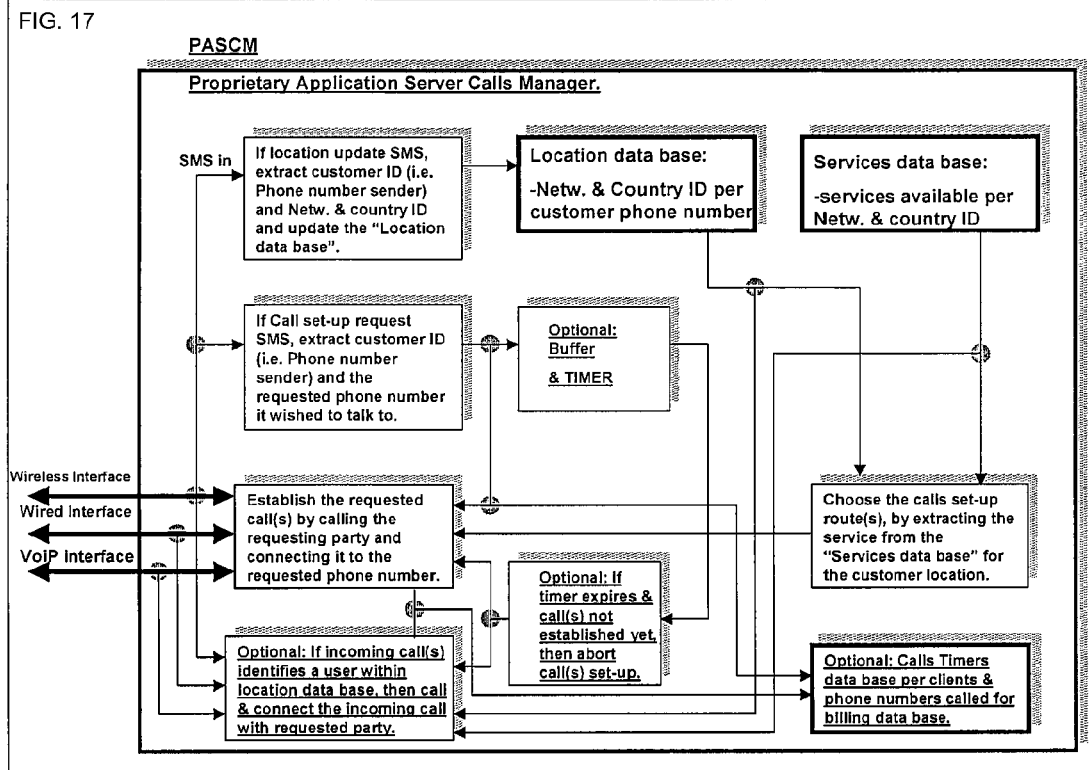

METHOD OF ENABLING A WIRELESS DEVICE TO MAKE A NETWORK CONNECTION WITHOUT USING A NETWORK OPERATOR'S HOME LOCATION REGISTER

CROSS REFERENCE TO RELATED APPLICATIONS

This application claims the priority of PCT/GB2007/000782 filed on Mar. 7, 2007, which claims priority to GB 0604537, filed Mar. 7, 2006, the entire contents of which are hereby incorporated herein by reference.

FIELD OF THE INVENTION

This invention relates in general terms to a method and apparatus of interfacing and connecting a wireless device to a network. It relates in particular to a method of enabling a wireless device to make a network connection without using a network operator's home location register (HLR).

BACKGROUND OF THE INVENTION

Wireless devices can now handle voice and/or data, allowing simplex and/or duplex voice calls, video calls, text messaging, and internet browsing. Some wireless communication devices can now handle voice-over-internet-protocol (VoIP) calls, and others are able to handle multimedia (voice, video, graphics) calls through the wireless networks and/or through wireless networks connected to the internet or media servers.

Different types of calls, initiated by wireless devices, can be restricted for some or most of their outgoing traffic; for example voice and data calls, as well as internet web browsing, can be restricted to those calls tariffs made available by the wireless network(s) that is subscribed to. Those wireless networks could be traditional wireless network operators or so called virtual network operators. The restrictions can even limit which web servers the user is actually allowed to access; in most or all cases the restrictions will limit the users in their home country to only one wireless network, i.e. the home wireless network to which the user is subscribed to.

Users of wireless devices subscribed to a specific wireless network in their home country, may however wish to have a choice of call set-up route(s), and also have the choice of viewing any web server or web-page that they desire, and to initiate their outgoing calls at the tariff of their choice and through any of the wireless network(s) available in their home country, as well as when roaming abroad. This would give each wireless device user the freedom to choose the cheapest option for each call set-up route for any outgoing traffic, such as outgoing -SMS, -voice call, -data call.

With existing systems however, this is very difficult because mobile network operators have little economic incentive to provide end-users with the freedom to choose the cheapest network for each call set-up route for any outgoing traffic, such as outgoing -SMS, -voice call, -data call. In fact, they have every economic incentive to make this very difficult. One mechanism that entrenches the network operators' ability to restrict such freedom is the fact that every network operator in effect has considerable control over each subscriber because each subscriber to a particular has to be registered in the home location register (HLR) of that operator in order to receive service. The ownership and control that a network operator has over its HLR constitutes a major entry barrier to competitors seeking to offer lower cost services.

Before summarising the invention, we will explain some background terms.

A Home Location Register (HLR) is a database that contains mobile subscriber information for all subscribers to an operator. It is owned and maintained by that mobile operator. A Visitor Location Register (VLR) is a database owned and maintained by a mobile operator. It contains temporary information about mobile subscribers that are currently located in a geographic area served by that mobile operator, but whose Home Location Register (HLR) is elsewhere.

HLR subscriber information includes the International Mobile Subscriber Identity (IMSI), service subscription information, location information (the identity of the currently serving Visitor Location Register (VLR) to enable the routing of mobile-terminated calls), service restrictions and supplementary services information. The HLR also initiates transactions with VLRs to complete incoming calls and to update subscriber data.

The IMSI is a unique non-dialable number allocated to each mobile subscriber that identifies the subscriber and his or her operator subscription. The IMSI is stored in the Subscriber Identity Module (SIM). The IMSI is made up of three parts (1) the mobile country code (MCC) consisting of three digits, (2) the Mobile Network Code (MNC) consisting of two digits, and (3) the Mobile Subscriber Identity Number (MSIN) with up to 10 digits.

When a mobile subscriber roams away from his home location and into a remote location (typically to a different country), SS7 messages are used to obtain information about the subscriber from the HLR, and to create a temporary record for the subscriber in the VLR. There is usually one VLR per operator. The VLR automatically updates the HLR with the new location information, which it does using an SS7 Location Update Request Message. The Location Update Message is routed to the HLR through the SS7 network, based on the global title translation of the IMSI that is stored within the SCCP Called Party Address portion of the message. The HLR responds with a message that informs the VLR whether the subscriber should be provided service in the new location.

Critical to an operator's ability to restrict what end-users can do is the fact that operators control their own HLR, which can be thought of as the gateway into the mobile communications system. Even 'virtual mobile network operators' (VMNOs) are in effect subservient to the mainstream network operators that manage the physical infrastructure because the VMNOs still need to access the HLRs of the network operators.

SUMMARY OF THE INVENTION

In the present invention, a wireless device can initiate a network connection without using a network operator's home location register (HLR). The wireless device sends data to a server that defines a call request; and the server decides on the appropriate routing over all available networks for that call request. But, unlike a conventional HLR, the server can receive communications from the device using any one of several different protocols, and is not limited to the MAP (mobile application part) protocol. For example, the wireless device can use SMS or HTTP over the internet to communicate with the server.

The server may enable the connection by conferencing the device and recipient into a single call. The server receives and detects incoming communications/calls, by monitoring all the available external interfaces to the server.

The server can also acts as a media server, so that the network connection is not limited to a voice connection, but includes also the transfer of any media asset, including data, video, and audio files, web pages and data, video and audio streaming.

The server initiates a local call to the device, using the information on the server's location data base and services data base to correctly re-route a calling party to the device. The server maintains a database of location updates provided by the device. The server may also act as a VOIP server.

The device can include a module that is responsible for contacting the server. This module can be implemented as software that is downloadable to the device. The module establishes and controls communication between the device and the server and provides location updates to the server. The module therefore monitors the wireless network name and country code associated with the device.

The module sends any change in the wireless network name or country code to the server. The module also sends real time clock data with each message to the server, defining the time at which the message was sent according to the real time clock the module has access to.

In one implementation, the user has to enter any data required by the server manually into the device. This will apply in particular where the device includes no module as described above.

The device may include a single SIM, the module enabling the device to operate as though it included two or more different IMSIs or SIMs. The module can be adapted to switch the single SIM between (a) operating as a local SIM and (b) operating as a roaming SIM. The module may itself form part of the single SIM.

The module monitors the device for an international call request, incoming call signalling, and caller ID. The module notifies the user if a connection has been made by the server to the required recipient; the module also notifies the user if no connection has been made and the attempt has timed-out. The module is adapted to switch the network operator that the device uses for a particular connection.

The server stores a record of the duration of each call, a record identifying each call and the respective call recipient. The server can then enable bills to be sent directly to the device user. The server will typically decide on the lowest cost routing for the connection.

The available networks includes networks controlled by multiple wireless network operators and networks controlled by multiple wireline network operators. The available networks can also include a network used or accessed by a mobile virtual network operator, virtual telecoms operator or a virtual telecoms provider.

The wireless device itself can be a mobile telephone, wireless card, smart phone or wireless module.

In one implementation, there is a proprietary applications module (PAM), which is capable of communicating user and/or media information to an application server (AS) with a built-in proprietary applications server calls manager (PASCM). The PAM is also capable of communicating user and/or media information to a media server (MS). The communication requires a wireless device (WD) or wireless handheld device (HS), with a built-in PAM, a wireless connection (IF-B) and a wireless network (WN). There can be various types of connection to the application server (AS) and/or a media server (MS):
- a wireless and/or wired interface (IF-C)
- a wireless and/or wired interface (IF-B) through a wireless network (WN) and a wireless and/or wired interface (IF-C) and through a fixed network (FN)
- a wireless and/or wired interface (IF-B) through a wireless network (WN) and a wireless and/or wired interface (IF-C) and through a voice over internet protocol network (VoIP) to an application server (AS) and/or a media server (MS))

A proprietary applications server calls manager (PASCM) is capable of communicating with any WD or HS that has a built in proprietary applications module (PAM). The PASCM enables the communication and exchange of user information with:
- any $3^{rd}$ party-wireless network (WN) and their end users (even if they do not have a built-in PAM)
- and/or any fixed network (FN) and their end users
- and/or any voice over internet protocol network (VoIP) and their end users.

This is possible through:
- a wireless and/or wired interface (IF-C) with a wireless network and
- a wireless interface (IF-B) with a WD or HS that have (and also those that don't have) a built in PAM,
- a wireless and/or wired interface (IF-C) with a fixed network (FN) end user, or
- a wireless and/or wired interface (IF-C) with a voice over internet protocol network (VoIP) end user.

The PAM establishes data communication between the WD or the HS and a wireless network coupled to a digital communication system with the PASCM. As a first step, the PAM provides location updates each time the WD or HS changes WN name or WN country or region or state. When the WD or HS establishes a standard call, then the PAM acts as a buffer processor between the WD or HS and the IF-B. In the event the call is a local in-country/region/state call or an international call, then the PAM will, automatically and transparently to the user, either (i) add a prefix to the dialled number and initiate the standard non-altered call or (ii) initiate a modified call with a prefix-number through the IF-B or (iii) send a call request to the PASCM with a dedicated SMS through the IF-B, or (iv) send a call request to the PASCM with an HTTP message using the internet or (v) send a call request to the PASCM through some other mechanism.

When the PASCM processes the call request it will, depending on its internal database, initiate the call set-up request by initiating the call from the AS to the WD or HS that initiated such call request and the $3^{rd}$ party that the WD or HS wishes to reach; it then conferences both into one phone call connection.

The PASCM records the status and actions of each WD and/or HS (with built in PAM): namely, their latest locations at all times, as well as the time of each WD and/or HS call and the duration of each call and the corresponding called $3^{rd}$ party identification by the PASCM on behalf of each WD or HS (with built-in PAM). This is done, inter alia, for billing processing.

Depending on a case by case basis, as established in the PASCM internal data base, the billing will be done:
- directly by the PASCM to the WD or HS user who requested such call set-up, or
- by the PASCM to a specific WN who then bills the specific WD or HS user who requested such calls set-up, or
- by the PASCM to a specific fixed network who then bills the specific WD or HS user who requested such calls set-up, or
- by the PASCM to a specific voice over internet protocol network VoIP, internet service provider ISP, who then bills the specific WD or HS user who requested such calls set-up.

BRIEF DESCRIPTION OF THE DRAWINGS

FIG. 1 is a block diagram of a communications system in accordance with the present invention. It includes wireless devices and application and media servers interconnected and communicating through a wireless interface and a wired interface. It also shows the overall basic functionality, with respect to the proprietary applications module (PAM and proprietary applications server calls manager (PASCM).

FIGS. 2 to 10 are implementations of the present invention with respect to the proprietary applications module (PAM).

FIGS. 11 to 16 are implementations of the present invention with respect to the sub-modules of the proprietary applications module (PAM).

FIG. 17 is an example implementation of the present invention with respect to the proprietary applications server calls manager (PASCM).

DETAILED DESCRIPTION OF THE DRAWINGS

Specifically, FIG. 1 is a block diagram of a multi media communications system, which can be used to implement an embodiment of the present invention. For this exemplary embodiment, there is shown
- a wireless handheld device (HS),
- a wireless device (WD), both with a built-in PAM,
- a wireless interface IF-B which provides connection for voice and data communication between the WD and/or HS and a wireless network,
- a fixed network which provides connection for voice and data communication between the wireless network and an application server (AS) and a media server (MS)
- a wireless and/or wired interface C, which provides connection for voice and data communication between the wireless network or fixed network and the application server (AS) and the media server (MS), Multiple configurations of the previous elements are possible. For example, there could be multiple wireless devices (WD n), multiple wireless handheld devices (HS n), multiple wireless interfaces (IF-Bn), multiple wireless networks (wireless network n), multiple fixed networks (fixed network n), multiple wireless and/or wired interfaces (Cn), multiple application servers (AS n) and multiple media servers (MS n).

Referring to FIG. 1, there is shown a wireless handheld device (HS), a wireless device (WD), both with a built-in PAM, and an application server (AS) with a built-in PASCM. The wireless device WD and handheld device HS have a downloaded or an embedded PAM. WD and HS are configured in accordance with a combination of technologies used in the field of handheld wireless devices and personal digital handheld wireless devices, such as (but not limited to) wireless phones, cellular phones, mobile phones, hand held radio frequency digital communication devices, personal digital assistants and so called smart-phones, which can communicate with the wireless networks as described.

The wireless network is configured in accordance with a combination of technologies used in the field of wireless digital communications networks; such as GSM-GPRS-WAP based wireless networks, GSM-GPRS-WAP-EDGE based wireless networks, UMTS based wireless networks, PCS based wireless networks, DCS based wireless networks, TDMA based wireless networks, WiFi or WiMax based wireless networks. The fixed network is configured in accordance with a combination of technologies used in the field of fixed wired line digital communications networks; such as but not limited to ATM based switching networks, ADSL or DSL based switching exchanges, fiber optics based switching exchanges, electronic data communication Internet network.

The application server (AS) is where the PASCM resides and all the data from any WD and/or HS (with a built-in PAM) is received, decoded, stored and processed. This data relates to individual users' location updates, calls set-up and any other such features, such as (but not limited to) call divert and billing.

There is also shown a media server (MS). The MS is configured in accordance with a combination of technologies used in the field of digital multi-media servers; such as (but not limited to) private storage devices that have their own unique address by means of a simple PC termination; private shared mass storage devices with their own allocated space and their own internet host address, using mass data processing computing devices; publicly shared mass storage devices which each have their own allocated space and their own internet host address, using mass data processing computing devices.

The MS specific multimedia data, in its most common application, is accessed by means of a unique address, such as (but not limited to) an internet web-site address accessed through the internet. However, a dedicated MS, such as (but not limited to) a dedicated music server or a dedicated video/ movie server or a dedicated multimedia server, can also be configured to reside at private sites such as private homes, at private or public company locations, private or public organizations locations, or even reside at the fixed network or wireless network locations such as (but not limited to) residing in the WAP (wireless application protocol) base internet network.

The wireless and/or wired interface C is configured in accordance with a combination of technologies used in the field of fixed wired line digital communications networks; such as (but not limited to) point to point wireless terrestrial connections, point to multipoint wireless connections, point to satellite and satellite to terrestrial connections, ATM based PSTN telephone line, coax or fiber optics connections, ADSL or DSL based PSTN telephone line, coax or fiber optics connections, Fiber optics based PSTN telephone line, coax or fiber optics connections.

In another embodiment of the present invention, the MS of FIG. 1 could also act as an application server, by simply embedding a single or multiple PASCM within such single or multiple MS. Any VoIP server could act as an application server again by simply embedding a single or multiple PASCM within such single or multiple VoIP server.

The preferred embodiment of the present invention and its advantages are best understood by referring to FIG. 1. Essentially, in accordance with an embodiment of the present invention, we have a method of and apparatus for interfacing and connecting a handheld device or a wireless device to set up call in accordance to a user's own choice of routing (and/or accessing media data) with any $3^{rd}$ party end user. There has to be a server (PASCM) to enable the interfacing; the connection can then be over wireless networks, fixed networks or the internet. The WD and/or HS (with a built-in PAM) establishes data communication over a wireless network that is coupled to a digital communication system that feeds the PASCM. The PAM provides location updates each time the WD or HS changes wireless network name or wireless network country or region or state.

When the WD or HS establishes a standard call, then the PAM acts as a buffer processor between the WD and/or HS and the IF-B, and in the event the call is a local in country/ region/state call, or an international call, then the PAM will, automatically and transparently to the user:
- add a prefix to the dialled number and initiate the standard non altered call or a modified call with a prefix-number through the IF-B,
- or send a call request to the PASCM through a dedicated SMS, or send an HTTP call request to the PASCM over the internet, or use any other means of communicating with the PASCM, through the IF-B.

When the server AS (in which a PASCM is embedded) processes the call request, it will, depending on its internal database, enable the call set-up request by initiating the call from the server to the originating WD and/or HS (with a built-in PAM) and also to the $3^{rd}$ party that the WD and/or HS, requested to communicate with. It will then conference both into one phone call connection.

The PASCM keeps records for each WD and/or HS (with built in PAM), including the latest locations, as well as any user features activated, such as call divert, as well as the actual time of each WD and/or HS call established by the PASCM, the duration of each call and corresponding called $3^{rd}$ party identification. This is for bill processing. Depending on a case by case basis as established in the PASCM internal data base, the billing will be done:

directly by the PASCM, or the server the PASCM is embedded into, to the WD or HS user who requested such calls set-up, or by the PASCM to a specific wireless network, who then bills the specific WD or HS user who requested such call set-up to the PASCM, or by the PASCM to a specific fixed network who then bills the specific WD or HS user who requested such call set-up, or by the PASCM to a specific voice over internet protocol network who then bills the specific WD or HS user who requested such calls set-up.

The WD and/or HS establishes data communication to a wireless network coupled to a digital communication system with the MS, using the wireless connection (IF-B), or through the wireless and/or wireless interface IF-C to the MS, or alternatively through the wired network to the MS.

Subsequently the WD and/or HS communicates the user information to the MS allowing full duplex user authentication of the WD and/or HS and thus exchanging, uploading and/or downloading user data and media data, in particular dedicated web-pages, audio and video media downloads from the MS to the WD and/or HS.

FIGS. 2, 3, 4 and 5 show two different preferred integration embodiments of the proprietary application module (PAM), which in the context of the foregoing are self explanatory, basically showing the integration of a PAM within a wireless device and within a handheld device respectively.

FIGS. 6 to 10 show five different preferred embodiments of the proprietary application module (PAM) of the invention, which in the context of the foregoing are self explanatory, basically showing some example of the different combinations of the composition of a PAM by combining its sub-modules respectively.

FIGS. 11 to 16 show the preferred implementation of the proprietary application module (PAM), which in the context of the foregoing are self explanatory, basically showing in each FIG. 11 to 16 an example flow-chart implementation of the following PAM sub-modules:

proprietary sub-module location update (LU),
proprietary sub-module international call set-up option1 (JC-SUO1),
proprietary sub-module international call set-up option2 (JC-SUO2),
proprietary sub-module local call set-up option1 (LCSUO1),
proprietary sub-module local call set-up option2 (LCSUO2), and
proprietary sub-module media server connection set-up (MSCSU)

FIG. 17 shows the preferred embodiment of the proprietary application server module (PASCM), which in the context of the foregoing are self explanatory, basically showing an example of its flow-chart implementation.

It should be clear from the preceding disclosures that the present invention provides a method and apparatus of interfacing and connecting a wireless device(s) and specific application server(s) for location update(s), in- and out-going call(s) routing & calls set-up, as well as accessing media data from specific servers linked to or embedded in the wireless network(s), fixed network(s) or the internet. Implementations of the invention provide an advantage allowing any wireless device with a built-in PAM (and also any media server) to be interconnected through the existing wireless networks. Moreover, this invention provides an advantage allowing any wireless device with a built-in PAM to choose the optimal call routing without needing to use a network operator's HLR.

This ability to interconnect and communicate between a wireless device (WD) and/or a wireless handheld device (HS), and an application server (AS) and/or any media server (MS) is particularly advantageous for multimedia communications, as well as data and voice calls: the end user previously had limited freedom of choice in terms of the wireless network used; this choice is now fully in the hand of the end user, so long as that user can access the PASCM server by some mechanism (e.g. internet, SMS etc.)

There are implementations of this invention (and variations and improvements), where the PAM(s) would reside in the wireless end-users' wireless handheld device(s) (HS) and/or wireless device(s) (WD). Likewise, the PASCM(s) could reside in server(s) connected to the internet. These approaches could in effect allow one to set-up a "internet mobile virtual network operator" (IMVNO), a "virtual telecoms operator" (VTO) or a "virtual telecoms provider" (VTP), thus introducing more competition in the wireless and/or cellular market place, benefiting end-users, without the need for any wireless device and/or wireless handheld user to change its current subscription with its wireless network operator. The benefits of this invention can be enjoyed by simply downloading or embedding a PAM within a wireless device (WD) and/or wireless handheld device (HS).

SUMMARY OF FEATURES IN AN IMPLEMENTATION

The following are optional features of a preferred implementation. The proprietary applications module (PAM) and a proprietary applications server calls manager (PASCM) is capable of communicating through a wireless connection (IF-B) and a wireless and/or wired connection (IF-C). The proprietary applications module (PAM) is capable of communicating Wireless devices' (WD) and/or wireless Handheld devices' (HS) user and/or media information to the proprietary applications server manager (PASCM). The proprietary applications server calls manager (PASCM) is capable of communicating with any WD and/or HS that has a built in proprietary applications module (PAM) and communicating and exchanging user information with any $3^{rd}$ party-wireless network (WN) and their end users, even if they do not have a build-in PAM and/or any fixed network (FN) and their end users and/or any voice over internet protocol network/server (VoIP) and their end users.

WD, WDn, HS and HSn are wireless devices and wireless handheld devices in any available current and future wireless technologies respectively, with a built-in PAM. IF-B and IF-Bn are wireless interfaces in any available current and future wireless technologies respectively.

WN and WNn are wireless networks in any available current and future wireless technologies respectively.

IF-C and IF-Cn are wireless and/or wired interfaces in any available current and future wireless and/or wired technologies respectively.

FN and FNn are fixed networks in any available current and future fixed line technologies respectively.

VoIP and VoIPn are wireless and/or wired voice over internet protocol networks or voice over internet protocol servers in any available current and future wireless and/or fixed line technologies respectively.

AS and ASn are dedicated applications servers, in any available current and future servers technologies respectively, with a built-in PASCM.

MS and MSn are media servers in any available current and future servers technologies respectively.

Any individual or multiple PASCM may be built-in as a single (or multiple) module into any one or more of WN, WNn, FN, FNn, MS, MSn, VoIP and VoIPn or any such other processing device(s) and/or server(s) connected to any communications system(s), such as (but not limited to) so called "servers", "internet servers", "computers", "PCs", "media servers", "wireless switching exchanges", "fixed switching exchanges", "wireless network processors", "fixed network processor", "ATM network", "ADSL network", "DSL network", "internet servers", "intranet servers".

Any individual or multiple PAM may be built-in into any WD, HS or any such other wireless device, such as (but not limited to) so called "handsets", "handy", "mobile phones", "cellular phones", "wireless phones", "smart phones", "wireless devices", "wireless PC cards", "wireless modules"

Any individual or multiple PAM may consist of any or all of the following proprietary sub-modules (or any single or multiple combination of these sub-modules) or indeed an equivalent of each such sub-module(s) performing a similar function:
proprietary sub-module location update (LU)
proprietary sub-module international call set-up option1 (ICSUO1)
proprietary sub-module international call set-up option2 (ICSUO2)
proprietary sub-module local call set-up option1 (LCSUO1)
proprietary sub-module local call set-up option2 (LCSUO2)
proprietary sub-module media server connection set-up (MSCSU)

Any individual or multiple wireless device (WD) and/or wireless handheld device (HS), with a built-in PAM, is capable of communicating with a PASCM built into a dedicated applications server (AS) through:
  a wireless connection with a wireless or mobile network directly to an AS, or
  through a wireless connection with a wireless or mobile network and then through a second wireless and/or wired connection through a fixed network or switching network to a AS, or
  through a first wireless connection with a wireless or mobile network and then through a second wireless and/or wired connection through a voice over internet protocol network or server to a AS.

A wireless device (WD) and/or wireless handheld device (HS) (with a built-in PAM), are capable of communicating their geographical location to an PASCM; the proprietary sub-module location update (LU) is a sub-part of the PAM and the LU enables the WD and/or HS through its built in PAM to inform the PASCM of the geographical location, meaning wireless network name & country code, of the WD and/or HS respectively.

The LU monitors the WD and/or HS internal network it is authorised for and actually synchronised to and extracts the corresponding wireless network name & country code. The country code can be also a state or region code, and the LU stores it in a temporary LU register memory or alternatively, if access is available from the LU to the WD and/or HS static read/write memory (such as i.e. EEPROM) then such location information will be stored by the LU in a free WD and/or HS memory address location. The LU then sends this stored location information by means of a dedicated SMS containing such location information to a predefined destination (i.e. phone number). The SMS will then be transmitted by the WD and/or HS standard SMS protocol through the wireless interface (IF-B) to its final destination—i.e. the PASCM. The LU will continue to monitor any change of the wireless network name & country code to which the WD and/or HS is authorised and synchronised to, in comparison to the latest stored location information of such WD and/or HS. Only in the event of any change of either the network name code or the country name code, will the LU will repeat the previously mentioned procedure of sending a new SMS to the PASCM with the new location information and overwriting the previously memorised/stored location information with the latest new location information into the LU register memory or, if available, within the static read/write memory of the WD and/or HS. Using a static memory that keeps its memory content even after switch off and on, is the preferred embodiment, if access is available to the LU, as this will reduce the number of SMS sent to a minimum.

The PAM is capable of transmitting, together with the information it sends to the PASCM, as described above, the real time clock information of when each data was sent by the PAM to the PASCM. The PASCM is capable of receiving, storing and processing, together with the information it receives from the PAM, the real time information (derived from the real time clock) at which the data was originated by the PAM. The PASCM also has a real time clock built-in for its internal data processing.

The wireless device (WD) and/or wireless handheld device (HS), through its built-in PAM, is capable of communicating with a PASCM; the proprietary sub-module international call set-up option1 (ICSUO1) is a sub-part of the PAM and informs the PASCM of an international call request by the WD and/or HS to a specific identified $3^{rd}$ party.

The ICSUO1 monitors the WD and/or HS internal key-pad, and (if available) any hotkey dedicated to an international call request; it also monitors for incoming call signalling, and caller ID if available. The key-pad serial numbers are buffered and stored in a ICSUO1 phone number register memory at the time the send key is hit by the WD and/or HS user. Then, the ICSUO1 will take priority over the WD and/HS call engine whilst it is processing the data and act as a buffer between the send key action inside the WD and/or HS and the internal outgoing call- and outgoing SMS- engine of the WD and/or HS (or other engine used to communicate with the PACSM). Following the previous action, the ICSUO1 will check if the stored phone number starts with either a "+" or "00" and if not it will stop its routines and allow the PAM to run its other sub-modules. But if 'yes', then the ICSUO1 will send an SMS (or other signal or message, e.g. over the internet) to the PASCM with the stored phone number previously mentioned.

At the same time, it will start or re-initiate an internal ICSUO1 timer which initiates the monitoring of the incoming call signalling of the WD and/or HS by the ICSUO1, and if access to the WD and/or HS display is available to the ICSUO1, then the ICSUO1 will display a user feedback message, such as "please hold" whilst the timer is running and "Retry later" if the timer expires. If the timer expires, the ICSUO1 stops and resets all its routines, the timer and the buffered phone number. However if the timer is not expired and an incoming call is received from a pre-defined identifier, then the ICSUO1 will accept the incoming call and optionally notify the requesting WD and/or HS that his call request to his specified $3^{rd}$ party number has been established by, for example, a loudspeaker feedback and/or a display feedback if available; it will also reset the timer. Alternatively, if the WD and/or HS does not support caller ID, then in the previous case when the timer has not expired and an incoming call is received, then the ICSUO1 will accept the incoming call anyway and reset the timer. Also (optionally) if access is available to the WD and/or HS call waiting function by the ICSUO1, then the ICSUO1 will activate the call waiting function when the it starts its internal ICSUO1 timer.

The wireless device (WD) and/or wireless handheld device (HS), (through its build-in PAM), is capable of re-routing an international call set-up request(s); a proprietary sub-module international call set-up option2 (ICSUO2) is a sub-part of the PAM and enables re-routing of an international call request by the WD and/or HS to a specific identified $3^{rd}$ party. ICSUO2 monitors the WD and/or HS internal key-pad, and any dedicated hotkey for an international call set-up request. The key-pad serial numbering for that request is buffered and stored in a ICSUO2 phone number register memory at the time the send key is hit by the WD and/or HS user. The ICSU2 will take priority over the WD and/HS call engine whilst it is processing the data and act as a buffer between the send key action (or similar action with the same function inside the WD and/or HS) and the internal outgoing call engine of the WD and/or HS. Following the previous action, the ICSUO2 checks if the stored phone number starts with either a "+" or "00" and if 'yes', it will stop its routines and allow the PAM to run its other sub-modules. However if not, then the ICSUO2 will add a pre-fix number to the stored phone number register and initiate an outgoing call on behalf of the requesting WD and/or HS using the new pre-fix phone number to call the requested $3^{rd}$ party. Optionally the ICSUO2 will, instead of adding a prefix number to the requested dialled number, replace it with a destination identifier of the requested $3^{rd}$ party that the user wishes to establish a communication with, for those cases that the WD and/or HS supports alternative ways of calling $3^{rd}$ parties, such as (but not limited to) where GPRS calls are supported, EDGE calls are supported, VoIP calls are supported.

The proprietary sub-module international call set-up option1 (ICSUO1) and the proprietary sub-module international call set-up option2 (ICSUO2) are a sub-part of the PAM and inform the PASCM of an international call request by the WD and/or HS to a specific, identified $3^{rd}$ party and/or re-routing of an international call set-up request. Both the ICSUO1 and ICSUO2 monitor the WD and/or HS internal actual synchronized wireless network- and country-name/code; only one of these sub-modules will be active and the other deactivated, depending on the services available in a look-up table for each wireless network- and country-name/code.

The proprietary sub-module local call set-up option1 (LCSUO1) is a sub-part of the PAM and the LCSUO1 and enables re-routing of a national/in-country/regional call request by the WD and/or HS to a specific identified $3^{rd}$ party. The LCSUO1 monitors the WD and/or HS internal key-pad, and any dedicated hotkey for that re-routing call request. The key-pad serial numbering is buffered and stored in a ICSUO2 phone number register memory at the time the send key is hit by the WD and/or HS user and then the ICSU2 will take priority over the WD and/HS call engine whilst it is processing the data and act as a buffer between the send key action (or similar action with the same function inside the WD and/or HS) and the internal outgoing call engine of the WD and/or HS. Following the previous action, the LCSUO1 checks if the stored phone number starts with either a "+" or "00" and if 'yes' it will stop its routines and allow the PAM to run its other sub-modules. However if not, then the LCSUO1 will add a pre-fix number to the stored phone number register and initiate an outgoing call on behalf of the requesting WD and/or HS using the new pre-fix phone number to call the requested $3^{rd}$ party. Optionally, the LCSUO2 will, instead of adding a prefix number to the requested dialled number, replace it with a destination identifier of the requested $3^{rd}$ party that the user wishes to establish a communication with, where the WD and/or HS supports alternative ways of calling $3^{rd}$ parties, such as (but not limited to) where GPRS calls are supported, EDGE calls are supported, VoIP calls are supported.

The proprietary sub-module local call set-up option2 (LCSUO2) is a sub-part of the PAM and informs the PASCM of a national/in-country/regional call request by the WD and/or HS to a specific identified $3^{rd}$ party. The LCSUO2 monitors the WD and/or HS internal key-pad, and any dedicated hot-key, for this call request; it also monitors incoming call signalling, and caller ID if available. The key-pad serial numbering is buffered and stored in a LCSUO2 phone number register memory at the time the send key is hit by the WD and/or HS user and then the LCSUO2 will take priority over the WD and/HS call engine whilst it is processing the data and act as a buffer between the send key action inside the WD and/or HS and the internal outgoing call- and outgoing SMS-engine (or other communications engine—essentially anything that enables communication with the PACSM) of the WD and/or HS. Following the previous action, the LCSUO2 will check if the stored phone number starts with either a "+" or "00" and if 'yes' stop its routines and allow the PAM to run its other sub-modules. However if not, then the LCSUO2 will send a SMS (or other data packet etc, depending on the nature of the communications protocol and type) to the PASCM with the stored phone number previously mentioned. At the same time, it will start or re-initiate an internal LCSUO2 timer, which initiates the monitoring of the incoming calls signalling of the WD and/or HS by the LCSUO2, and if an access to the WD and/or HS display is available to the LCSUO2 then the LCSUO2 will display a user feedback message, such as in example "please hold" whilst timer is running and "Retry later" if the timer expires. If the timer expires, the LCSUO2 stops and resets all its routines, timer and buffered phone number. However, if the timer is not expired and an incoming call is received from a pre-defined identifier, then the LCSUO2 will accept the incoming call and optionally notify the requesting WD and/or HS that his call request to his specified $3^{rd}$ party number has been established by (for example) a loudspeaker feedback and/or a display feedback if available. It will also reset the timer. Alternatively, only if the WD and/or HS does not support caller ID, then in the previous case when the timer has not expired and an incoming call is received, then the LCSUO2 will accept the incoming call anyway and reset the timer. Also optionally if access is available to the WD and/or HS call waiting function by the LCSUO2, then the LCSUO2 will activate the call waiting function when it starts its internal LCSUO2 timer.

The proprietary sub-module local call set-up option1 (LCSUO1) and the proprietary sub-module local call set-up option2 (LCSUO2) are a sub-part of the PAM and the LCSUO1 and LCSUO2 allow the WD and/or HS to either re-route a national/in-country/regional calls request, or inform the PASCM of a national/in-country/regional calls request by the WD and/or HS to a specific identified $3^{rd}$ party. Both the LCSUO1 and LCSUO2 monitor the WD and/or HS internal actual synchronized wireless network- and country-name/code; only one of the sub-modules will be active and the other deactivated, depending on the services available in a look-up table for each wireless network- and country-name/code.

Where the wireless device (WD) and/or wireless handheld device (HS), is capable of communicating with a MS, the proprietary media server connection set-up sub-module (MSCSU) is a sub-part of the PAM and the MSCSU allows the WD and/or HS to communicate or re-route the web browser addresses requested by the WD and/or HS to a specific identified web internet server address. The MSCSU monitors the WD and/or HS internal key-pad, web browser- and its addresses-engine and any dedicated hotkey for this function. The web address requested by the WD and/or HS is buffered and stored by the MSCSU in a MSCSU "temporary register memory" at the time the send key or dedicated web key is hit by the WD and/or HS user. The MSCSU will take priority over the WD and/HS web browser engine whilst it is processing the data and act as a buffer between the send- or dedicated web-key action inside the WD and/or HS and the internal web browser engine of the WD and/or HS. Following the previous action, the MSCSU will check if its internal web internet server addresses data base has a re-route web address for the wireless network name- and country-code to which the WD and/or HS is synchronised to, and if not, the MSCSU will use the temporary web address register memory to set up the web connection on behalf of the WD and/or HS, and if 'yes' the MSCSU will use the re-route web address from the internal MSCSU "web internet server addresses data base" corresponding to the wireless network name- and country-code to which the WD and/or HS is synchronised to, to set up the web connection on behalf of the WD and/or HS. Once the web connection has been set-up, the MSCSU resets its internal "temporary register memory".

The proprietary applications server calls manager (PASCM) is capable of communicating and exchanging user information with any WD or HS (that has a built-in proprietary applications module (PAM)) and communicating and exchanging user information with any $3^{rd}$ party-wireless network (WN). It is capable of communicating with their wireless end users, even if they do not have a built-in PAM and/or communicating and exchanging user information with any $3^{rd}$ party fixed network (FN) and communicating with their end users. It is capable of communicating and exchanging user information with any voice over internet protocol network/server (VoIP) and communicating with their end users. The PASCM monitors all incoming messages (e.g. SMS, HTTP etc), for example those originated by any PAM, as well as monitoring the wireless interfaces (IF-B), and the wired and/or wireless interfaces (IF-C), as well as the interface to the "voice over internet protocol server/network" (VoIP). If an incoming SMS or HTTP message is detected as being originated by a PAM as a location update SMS or HTTP message, then the PASCM proceeds to extract the identifier of the sender of the message and its location, for example the phone number of the originator and network name- and country-code to which the originator is synchronised to, and consequently updates the "location data base" for this specifically identified user. This approach eliminates the need for there to be a conventional HLR and hence removes the dependency on conventional network operators, who control the HLRs.

The PASCM monitors all incoming SMS and HTTP messages (and messages using any other format or protocol), for example those originated by any PAM, as well as monitoring the wireless interfaces (IF-B), and the wired and/or wireless interfaces (IF-C), as well as the interface to "voice over internet protocol server/network" (VoIP). If an incoming SMS (etc.) is detected as being originated by a PAM as a "call set-up request" SMS, then the PASCM proceeds to extract the identifier of the sender of the SMS and the identifier of the $3^{rd}$ party it wishes to establish a communication with and optionally store these in a temporary buffer memory. It then initiates an internal PASCM programmable timer, for example the phone number of the SMS originator and the phone number of the $3^{rd}$ party it wishes to talk to, and consequently the PASCM will choose the calls set-up route, depending on the requesting party's location from the PASCM "location data base" and the PASCM "services database" corresponding to such specific "call set-up requesting party" location.

With the selected calls route(s), for example wireless interface IF-B and/or wired interface IF-C and/or voice over internet protocol VOIP, the PASCM will initiate a call to the requesting party. And it will initiate a call to the $3^{rd}$ party it wishes to talk to and conference both calls as one single communication between the parties. Multi-party conference calls are also possible. If the previously mentioned timer expires, then the requested call set-up that corresponds to that specific time-out will be aborted and the corresponding temporary buffer cleared/reset.

The PASCM monitors all its internal routines and in particular all temporary buffer memories with the information of all the "call set-up" requesting parties and the "$3^{rd}$ party each of them wishes to establish a communication with" and initiates one or two timers corresponding to each call that the PASCM initiates between each specific call requesting party and the corresponding $3^{rd}$ party it is communicating to. These previously mentioned timer(s), together with the identifier of the call requesting party, as well as the identifier of $3^{rd}$ party it communicated with, will then be stored in a PASCM billing data base or optionally stored in any other database, external to the PASCM, for billing processing. Following the previous action and once each individual call that was set-up by the PASCM is terminated, by either the call requesting party and/or the $3^{rd}$ party it communicated with, then the PASCM will terminate those specific corresponding call(s) it had set-up and reset the timers and temporary buffers corresponding to such specific call set-up request.

Any individual or multiple PAM may be stored- into any WN, WNn, FN, FNn, MS, MSn, VoIP and VoIPn or any such other storage device(s) and/or server(s) connected to any communications system(s), such as (but not limited to) so called "servers", "internet servers", "computers", "PCs", "media servers", "wireless switching exchanges", "fixed switching exchanges", "wireless network processors", "fixed network processor", "ATM network", "ADSL network", "DSL network", "internet servers", "intranet servers". From or through these storage devices/servers, any current and/or future wireless device can download a PAM or any evolution-, update-, upgrade-, modification of a PAM. Downloading can use for example GPRS, WAP, JAVA.

Any individual or multiple PAM may be a part of (including an integral part of) any wireless device (WD) and/or wireless handheld device (HS), be it as software-, firmware-, hardware- or a combination that can perform the same or an equivalent function as the PAM we have described. Any such individual or multiple PAM may be activated or deactivated by the user of each individual WD and/or HS.

Any individual or multiple PASCM may be stored- into any WN, WNn, FN, FNn, MS, MSn, VoIP and VoIPn or any such other storage device(s) and/or server(s) connected to any communications system(s), such as in example but not limited to so called "servers", "internet servers", "computers", "PCs", "media servers", "wireless switching exchanges", "fixed switching exchanges", "wireless network processors", "fixed network processor", "ATM network", "ADSL network", "DSL network", "internet servers", "intranet servers". Any current and/or future communications processing device and in particular but not limited to any AS and MS capable of downloading applications using, for example, ATM, ADSL, DSL, or internet, can download a PASCM or any evolution-, update-, upgrade-, modification- of a PACSM from such storage device or server.

One or a multiple of PASCMs is capable of receiving and detecting incoming communications/calls, by monitoring all the available external interfaces to the PASCM, such as but not limited to the wireless interface and/or wired interface and/or VoIP interface. The incoming calls are from any $3^{rd}$ party requesting to communicate with any WD and/or HS with a built-in PAM; the $3^{rd}$ party calls the unique PASCM identifier of such individual WD and/or HS user recognised within the PASCM. It is the PASCM that will always initiate a local call to the specific WD and/or HS, using the information of the PASCM "location data base" and the "Services data base" to re-route the calling party either through VoIP to the country where the WD and/or HS is located and then through a standard PASCM call set-up as defined within this invention.

The PAM is capable of communicating with the PASCM; it is capable of communicating to the PASCM a "call divert identifier activation" that alerts the PASCM that all communications from the PASCM are to be diverted to the specific divert identifier as communicated by the PAM to PASCM; for example a divert phone number or a VoIP address or any such other calling route identifier where the originating WD and/or HS can be contacted for any call set-up by the PASCM.

The PAM is also capable of communicating to the PASCM a "call divert identifier de-activation", alerting the PASCM that the PAM can be contacted for all communications, in particular the call set-up originated from the PASCM for call routing to the WD and/or HS (that originated the information communicated to the PASCM), through its original identifier, for example its own original identifying phone number.

The PASCM is capable of detecting and storing, a "call divert identifier activation" originated by a specific WD and/or HS user (with a built-in PAM), in the corresponding user location data base. The PASCM will use the "call divert identifier activation" to divert any call set-up the PASCM originates from then on, to a specific user, as identified within the PASCM location data base. The PASCM re-routes any calls to that specific user to the location identifier that the user provided, until such time that the PASCM detects and stores a "call divert identifier de-activation" originated by that same user. In that event, the PASCM updates the location identifier of that specific user in its location database and the PASCM returns to its normal procedures/routines as defined previously within this invention.

All the users' billing information detection and storage forms an integral part of a PASCM. All the users' billing data processing also forms an integral part of the PASCM. The PASCM is capable of routing any $3^{rd}$ party incoming call to any VoIP destination.

The LU, ICSUO1 and LCSUO2 informs the PASCM with the WD and/or HS location update, local call- and/or international call-set-up request, or any such other data transferred by the LU, ICSUO1 and LCSUO2 to the PASCM, by means of GPRS or WAP as an alternative to or instead of an SMS or any such other means available in any WD and/or HS with a build-in PAM which achieves the same function.

The PASCM extracts information originated by a WD and/or HS (with built-in PAM), such as but not limited to location updates, call requests, or any such other data transferred by the LU, ICSUO1 and LCSUO2 (which are sub-modules of the PAM) to the PASCM. Transfer can be by means of GPRS or WAP as an alternative to or instead of SMS or HTTP message, or can be any such other means available in any WD and/or HS which achieves the same function.

The PASCM is capable of processing its internal data taking into account the real time clock information corresponding to data it receives and stores from the PAM, as well as its own internal real time clock information. The internal real time clock can optionally be used for example for the following: to adjust its internal PASCM counters, for example (but not limited to) the call set-up processing timer(s), in order to align the timer within the PAM that monitors the incoming call set-up and the timer in the PASCM that establishes the corresponding call. This means that the call set-up timer of the PAM is set at expiration time value "a" and the corresponding timer of the call set-up within the PASCM will then be adjusted and set at ("a"—(real time clock value of PASCM at the time the PASCM received the corresponding data—real time clock value of such corresponding call set-up message originated from the corresponding PAM)). Alternatively, any such other PASCM timer adjustments can be used, depending on each network(s) route and corresponding data transfer delay between the PAM data transmission and the PASCM data reception.

The PAM is capable of communicating to the PASCM through the same method and means as explained earlier on that the WD and/or HS (with the built-in PAM) is switched on or off and where the PASCM is capable of receiving and detecting and storing such switch-on or switch-off state of the PAM.

The PAM is capable of communicating with the PASCM and the wireless network, providing a standard call divert to a phone number (or equivalent identifier) controlled by the PASCM and assigned to that specific PAM. A "re-route identifier activation" is also provided by the PAM to the PASCM, alerting the PASCM that all incoming communications detected by the PASCM from the phone number or equivalent identifier controlled by the PASCM and assigned to that specific PAM are to be routed through the PASCM to the corresponding PAM. Upon detection of such incoming calls by the PASCM, the PASCM will first check its internal data base to see if a "call divert identifier activation" is set for the corresponding WD and/or HS user (with a built-in PAM) and re-route the corresponding incoming call to such divert identifier. If not set, the PASCM will re-route the corresponding incoming call to the corresponding WD and/or HS user (with a built-in PAM). Optionally, the PASCM can take into account the switch-on or switch-off state of the corresponding PAM within the PASCM database and provide a "busy" or "not reachable" notification to the incoming user trying to communicate with the corresponding PAM, in the event the switch-off mode is set and the "call divert identifier activation" is not set. Or it can re-route the corresponding incoming call to the call identifier set by the corresponding PAM within the PASCM data base when the "call divert identifier activation" is set. Or the PASCM can re-route the corresponding incoming call to the WD and/or HS (with the built-in PAM) when the switch-on mode is set and the "call divert identifier activation" is not set within the PASCM data base.

Many modifications and variations of this present invention are possible in view of the above disclosures, drawings and explanations. Thus, it is to be understood that, within the scope of the appended claims, the invention can be practiced other than as specifically described above. The invention which is intended to be protected should not, however, be construed as limited to the particular forms disclosed, or implementation examples outlined, as these are to be regarded as illustrative rather than restrictive. Variations in changes could be made by those skilled in the art without deviating from the spirit of the invention. Accordingly, the foregoing detailed descriptions and drawings should be considered exemplary in nature and not limited to the scope and spirit of the invention as set forth in the claims.

The invention claimed is:

1. A method of enabling a wireless device, located in a region, to initiate a network connection without using a network operator's home location register that covers that region, comprising the steps of:
   (a) the wireless device using a module that is responsible for contacting a server to communicate with the server over a wireless link, wherein the device includes the module that is implemented as software and that is downloadable to the device;
   (b) the wireless device using the module to send, over the wireless link, data to the server that defines a call request;
   (c) in response to the call request, a software application running on the server deciding on the appropriate routing to a third party end-user over all available networks for that call request without using the network operator's home or visitor location register.

2. The method of claim 1 in which the server can receive communications from the device using any one of several different protocols, and is not limited to the MAP (mobile application part) protocol.

3. The method of claim 1 in which the wireless device uses SMS (Short Message Service) to communicate with the server.

4. The method of claim 1, in which the wireless device uses HTTP (Hypertext Transfer Protocol) over the internet to communicate with the server.

5. The method of claim 4 in which the user has to enter any data required by the server manually into the device.

6. The method of claim 1, in which the server enables the connection by conferencing the device and recipient into a single call.

7. The method of claim 1, in which the server receives and detects incoming communications/calls, by monitoring all the available external interfaces to the server.

8. The method of claim 1, in which the server also acts as a media server so that the network connection is not limited to a voice connection, but includes also the transfer of any media asset, including data, video, and audio files, web pages and data, video and audio streaming.

9. The method of claim 1, in which the server initiates a local call to the device, using the information on the server's location data base and services data base to correctly re-route a calling party to the device.

10. The method of claim 1, in which the server maintains a database of location updates provided by the device.

11. The method of claim 1, in which the server also acts as a VoIP server.

12. The method of claim 1 in which the module establishes and controls communication between the device and the server.

13. The method of claim 1 in which the module provides location updates to the server.

14. The method of claim 1 in which the module monitors the wireless network name and country code associated with the device.

15. The method of claim 14 in which the module sends a change in the wireless network name or country code to the server.

16. The method of claim 1 in which the module sends real time clock data with each message to the server, defining the time at which the message was sent according to the real time clock the module has access to.

17. The method of claim 1 in which the module monitors the device for an international call request, incoming call signalling, and caller ID.

18. The method of claim 1 in which the module notifies the user if a connection has been made by the server to the required recipient.

19. The method of claim 1 in which the module notifies the user if no connection has been made and the attempt has timed-out.

20. The method of claim 1 in which the server decides on the lowest cost routing for the connection.

21. The method of preceding claim 13 wherein the location updates are derived from SMS (Short Message Service) or HTTP (Hypertext Transfer Protocol) location update messages provided by the device.

22. The method of claim 1 wherein the server includes a software application that functions as a calls manager, the method comprising the steps of:
   (a) the wireless device communicating with the server over a wireless link;
   (b) the calls manager software extracting from a received message an identifier of a sender and a location;
   (c) the calls manager software updating a location in a location database for the sender, wherein the location database is different to the network operator's home location register;
   (d) the wireless device sending, over the wireless link, data to the server that defines a call request;
   (e) in response to the call request, the calls manager software included on the server deciding on the appropriate routing over all available networks for that call request according to the location of the sender in the location database.

23. A system comprising a wireless device located in a region and a server for enabling the wireless device to communicate with the server to initiate a network connection without using a network operator's home location register that covers that region, wherein the server includes a software application that functions as a calls manager, wherein:
   (a) the wireless device is operable using a module that is responsible for contacting the server to communicate with the server over a wireless link, wherein the device includes the module that is implemented as software and that is downloadable to the device;
   (b) the wireless device is operable using the module to send, over the wireless link, data to the server that defines a call request;
   (c) in response to the call request, the calls manager software included on the server is operable to decide on the appropriate routing to a third party end-user over all available networks for that call request without using the network operator's home or visitor location register.

24. A server for enabling a wireless device to communicate with the server to initiate a network connection without using a network operator's home location register, wherein the server includes a software application that functions as a calls manager, wherein:
   (a) the wireless device is operable using a module that is responsible for contacting the server to communicate with the server over a wireless link, wherein the device includes the module that is implemented as software and that is downloadable to the device;
   (b) the wireless device is operable using the module to send, over the wireless link, data to the server that defines a call request;
   (c) in response to the call request, the calls manager software included on the server is operable to decide on the appropriate routing to a third party end-user over all available networks for that call request without using that network operator's home or visitor location register.

* * * * *